United States Patent [19]
Motose et al.

[11] Patent Number: 6,116,228
[45] Date of Patent: Sep. 12, 2000

[54] CONTROL FOR ENGINE

[75] Inventors: Hitoshi Motose; Masahiko Kato, both of Hamamatsu, Japan

[73] Assignee: Sanshin Kogyo Kabushiki Kaisha, Hamamatsu, Japan

[21] Appl. No.: 09/209,540

[22] Filed: Dec. 11, 1998

[30] Foreign Application Priority Data

Dec. 18, 1997 [JP] Japan .................................. 9-349480

[51] Int. Cl.⁷ .................................................. F02D 41/14
[52] U.S. Cl. ...................... 123/679; 123/305; 123/677; 123/689
[58] Field of Search ........................ 123/295, 305, 123/672, 677, 679, 687, 688, 689, 479

[56] References Cited

U.S. PATENT DOCUMENTS

| | | | |
|---|---|---|---|
| 5,067,463 | 11/1991 | Remboski et al. | 123/406.28 |
| 5,579,745 | 12/1996 | Katoh et al. | 123/679 |
| 5,687,700 | 11/1997 | Kato | 123/688 |
| 5,694,909 | 12/1997 | Kato | 123/672 |
| 5,697,354 | 12/1997 | Kato | 123/687 |
| 5,697,535 | 12/1997 | Katoh et al. | 123/679 |
| 5,775,311 | 7/1998 | Kato et al. | 123/688 |
| 5,918,584 | 7/1999 | Kato | 123/688 |
| 5,921,220 | 7/1999 | Kato | 123/689 |
| 5,927,247 | 7/1999 | Tanaka | 123/672 |
| 5,941,223 | 8/1999 | Kato | 123/679 |

*Primary Examiner*—Willis R. Wolfe
*Attorney, Agent, or Firm*—Knobbe, Martens, Olson & Bear LLP

[57] ABSTRACT

A feed back control system and method for direct injected engines, particularly useful in marine applications to avoid excessive hunting due to the close proximity of the sensor to the fuel injector. Both injection initiation and duration are controlled under most operating conditions. However, under certain conditions such as when only small corrections in the air fuel ratio are required the control is initially maintained by adjusting the injection timing.

15 Claims, 9 Drawing Sheets

Figure 12

CONTROL FOR ENGINE

BACKGROUND OF THE INVENTION

This invention relates to a control for an engine and more particularly to an improved feedback control system and method for a direct injected internal combustion engine.

In the interest of improving engine performance and particularly fuel efficiency and exhaust emission control, many types of engines now employ fuel injection and/or feedback control of the fuel supply to the engine. Fuel injection has the advantages of permitting the amount of fuel delivered for each cycle of the engine to be adjusted. In addition, by utilizing fuel injection and a feedback control system, it is possible to maintain the desired fuel air ratio under a wide variety of engine running condition.

These features are particularly useful with two cycle engines, although not specifically limited thereto. The utilization of these features with two cycle engines is important, however, because of the emission characteristics of the two cycle engine is somewhat poorer than those of the four cycle engine. This is the result of the fact that the engine fires every revolution and there is a fairly substantial overlap during the scavenging and exhaust cycles.

Generally, these systems operate with a combustion condition sensor such as an oxygen ($O_2$) sensor that outputs a signal indicating whether the mixture is lean or rich. If the mixture deviates from the desired mixture, then incremental adjustments may be made to bring the mixture back into the desired relationship.

When feedback control is utilized with direct cylinder injected engines, the fuel injector is positioned in fairly close proximity to the combustion condition sensor. This is because the combustion condition sensor normally is positioned at a place in or near the cylinder where it will be able to sense the condition of the combustion products immediately toward the end of the combustion cycle.

With two cycle engines, this may be done by placing the combustion chamber so that it communicates with a cylinder at a point adjacent the exhaust port and slightly above it. In this way, the sensor will sense the combustion conditions before the exhaust port opens, but at the time when combustion will be fairly well completed. However, this places the sensor in a position where fuel can also impinge upon it and this can give rise to certain problems.

In addition to the fuel impingement problem, when the combustion condition sensor is positioned in close proximity to the fuel injector, there may be conditions when only minute adjustments in fuel supply are necessary to maintain the desired running condition. However, because of the inherent overshoot nature of feedback control systems, this can cause fairly substantial fluctuations in the air fuel ratio that may be detected by the operator and which may give the operator an uneasy feeling.

The problem is particularly acute in connection with marine applications because the exhaust gases may be discharged to the atmosphere through the body of water in which the watercraft is operating for silencing purposes. The water level can change due to boat motion, changes in both velocity and other factors. In addition, the trim angle and height of the propulsion unit may be altered, and this also will change the back pressure and, accordingly, the desired fuel air fuel ratio.

It is, therefore, a principle object of this invention to provide an improved control strategy for a feedback control engine and feedback control system wherein areas of low fluctuation in air fuel ratio are accommodated by a means other than by adjusting the amount of fuel injected.

It is a further object of this invention to provide an improved control strategy and method for feedback control engines wherein hunting is minimized, particularly during areas where only small adjustments in fuel supply are required.

SUMMARY OF THE INVENTION

This invention is adapted to be embodied in an engine having a combustion chamber to which an intake charge is delivered by an induction system. An exhaust system is provided for discharging a burnt charge from the combustion chamber. A fuel injector is provided for injecting fuel into the air supplied by the induction system. A combustion condition sensor is provided that communicates with the combustion chamber so as to sense the air fuel ratio therein. A feedback control system adjusts the timing and duration of fuel injection in response to the output of the combustion condition sensor.

In accordance with a method for practicing the invention, in engine operational areas where only minute adjustments are required to maintain the desired air fuel ratio, the injection timing, rather than the injection duration, is adjusted.

In accordance with an engine operating on this principle, the fuel injection control accommodates small changes in air fuel ratio by adjusting the injection timing rather than the injection duration.

DETAILED DESCRIPTION OF THE PREFERRED EMBODIMENTS OF THE INVENTION

Figure 1:
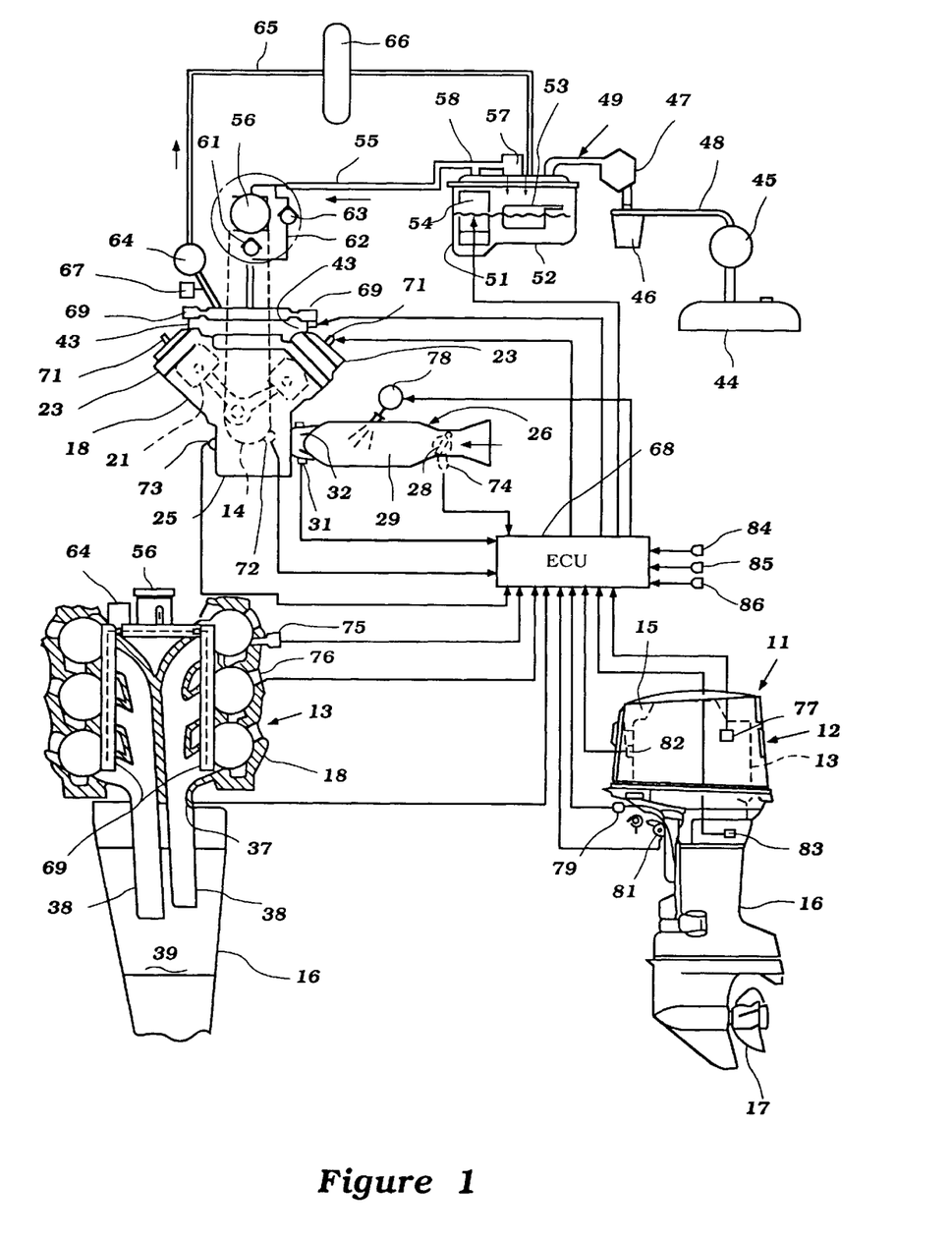
FIG. 1 is a partially schematic view having three portions that are connected by the controlling ECU of the engine. The lower right hand portion of this view shows a side elevational view of an outboard motor, the lower left hand side shows a rear elevational view of the outboard motor on an enlarged scale and a partial cross-section of the engine taken through the cylinders and exhaust manifold and the upper portion shows a top plan view of the engine and the fuel supply system with portions shown schematically.

Referring initially primarily to FIG. 1, the lower right hand portion of this view illustrates a side elevational of an outboard motor that is constructed and operated in accordance with the invention. The outboard motor is indicated generally by the reference numeral 11 and except as will hereinafter be noted maybe considered to be of a generally conventional construction.

Figure 12:
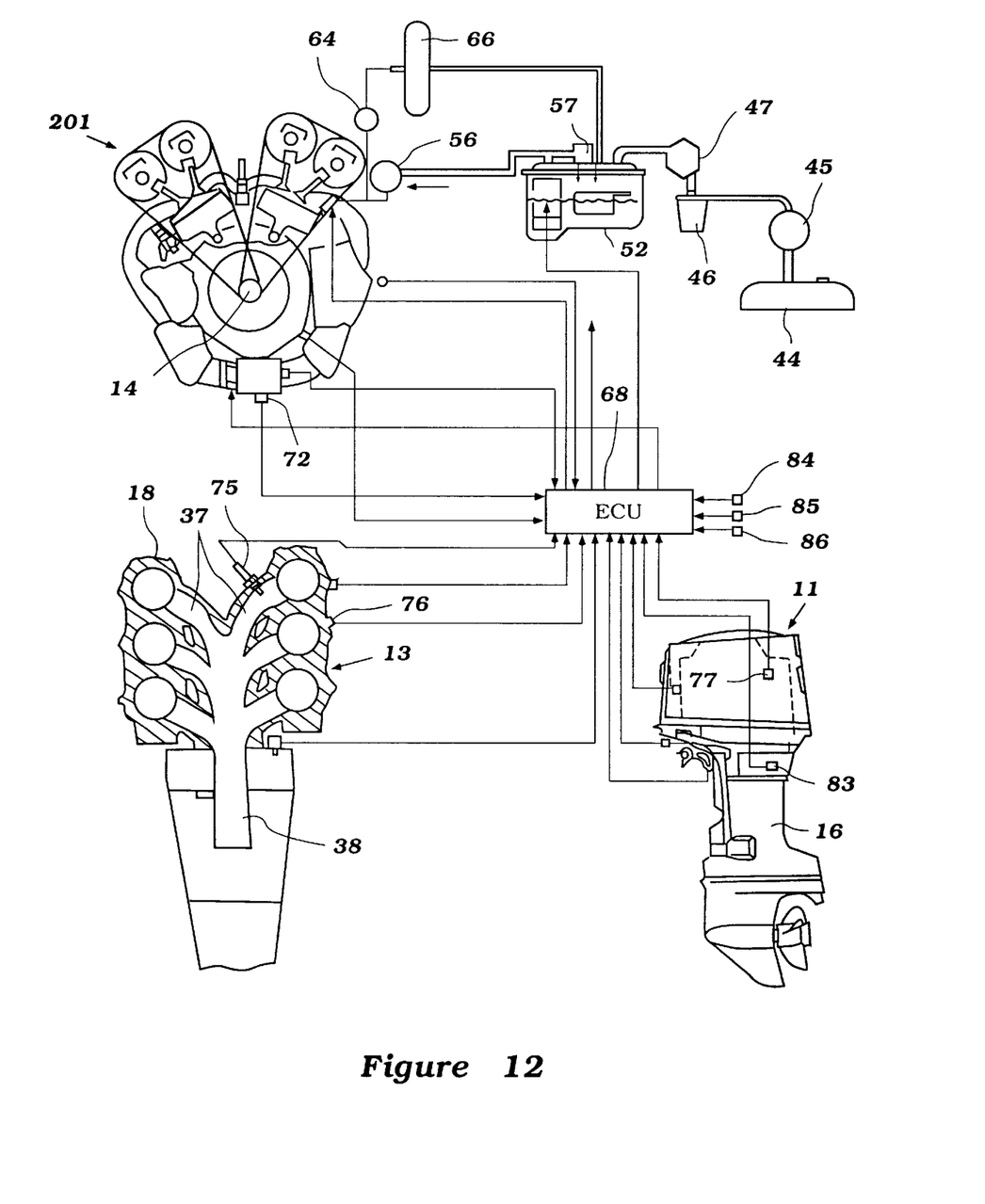
FIG. 12 is a view in part similar to FIG. 1 having the same three-part views but showing how the invention can be employed in conjunction with a four-cycle engine.

The outboard motor 11 is comprised of a power head 12 that contains a powering internal combustion engine 13. As best seen in the other two portions of this figure, the engine 13 is, in this embodiment, of the V6 type and operates on a two stroke crankcase compression principal. Although the number of cylinders and cylinder orientation can be varied, the invention has particularly utility in connection with two cycle engines and particularly those having multiple cylinders but certain of the control strategy also is applicable to four cycle engines. Such an embodiment is shown in FIG. 12.

As is typical with outboard motor practice, the engine 13 is supported in the power head 12 so that its crankshaft 14 rotates about a vertically extending axis for a reason which will be described momentarily.

The power head 12 is completed by a protective cowling 15 which surrounds and protects the engine 13. This protective cowling 15 is formed with an air inlet opening so that induction air for operation for the engine 13 can be drawn from the surrounding atmosphere.

The engine 13 and specifically its crankshaft 14 is coupled to a driveshaft (not shown) that depends into and is journaled within a driveshaft housing lower unit assembly 16. This is the reason for the vertical orientation of the axis of rotation of the crankshaft 14. This driveshaft depends into the lower unit where it drives a propulsion device for an associated watercraft through a suitable transmission. In the illustrated embodiment, the propulsion device comprises a propeller 17 which is selectively driven in forward and reversed directions through a bevel gear reversing transmission of the type well known in this art.

The outboard motor 11 also includes clamping and swivel brackets or another arrangement for mounting it to the transom of an associated watercraft. Since these types of constructions are well known in the art, further description of them is not believed to be necessary to permit those skilled in the art to practice the invention. The mounting arrangement is such, however, that the height and trim angle of the propeller 17 may be adjusted, even during running. This is significant in the engine control, as will become apparent.

Figure 2:
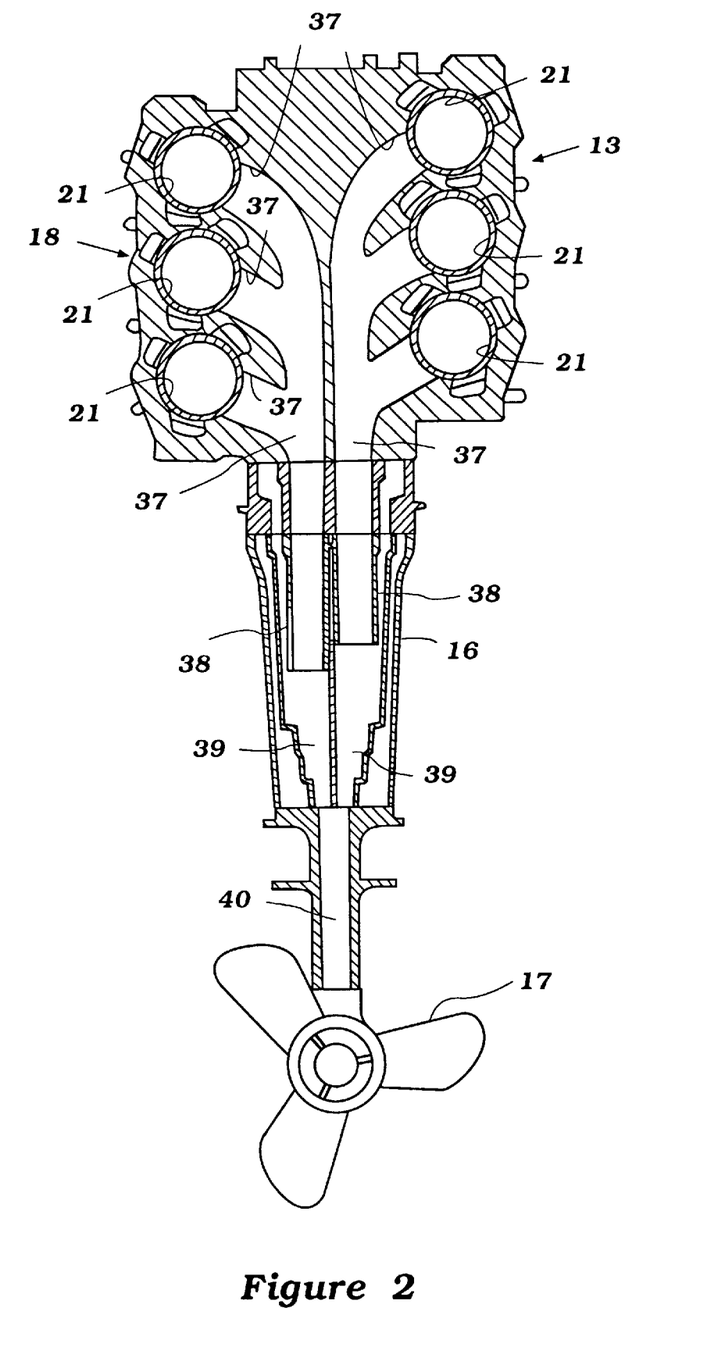
FIG. 2 is an enlarged and more complete view of the outboard motor as shown in the lower left hand view of FIG. 1.

Referring now primarily to the lower left hand view and the upper view of FIG. 1 and additionally to FIG. 2, the engine 13 includes a cylinder block, indicated generally by the reference numeral 18. Because of the V-type configuration employed in this embodiment, the cylinder block 18 is formed with two cylinder banks each of which has three vertically spaced cylinder bores 19. Pistons 21 are slidably supported in the cylinder bores 19. The pistons 21 are connected by means of connecting rods 22 to the throws of the crankshaft 14 for driving it in a known manner.

Cylinder head assemblies, indicated generally by the reference numeral 23 are affixed to the banks of the cylinder block 18 and close the cylinder bores 21. These cylinder head assemblies 22, the cylinder bores 19 and the pistons 21 form the combustion chambers of the engine 13.

The crankshaft 14 rotates in a crankcase chamber defined by the cylinder block 18 and a crankcase member 24 that is affixed thereto. As is typical with two cycle crankcase compression engines, the portions of the crankcase chamber, indicated schematically at 25, associated with each of the cylinder bores 19 are sealed from each other.

An air charge is delivered to these individual crankcase chamber sections 25 by an air induction system which appears also in the upper portion of FIG. 1 and which is indicated generally by the reference numeral 26. This induction system 26 includes an air inlet device 27 that may include a silencing arrangement and which draws air from within the protective cowling 15 that has been admitted through the aforenoted inlet opening.

A throttle valve 28 is provided in throttle bodies that communicate with the intake device 27 and deliver it to intake manifold runners 29 of an intake manifold assembly. The throttle valves 28 are controlled in any suitable manner to satisfy the operator demand. The intake manifold runners 29 communicate with intake ports 31 formed in the crankcase member 24 and each associated with a respective cylinder bore 19.

Reed type check valves 32 are provided in the manifold runners 29 adjacent the intake ports 31. These reed type check valves permit an air charge to be drawn into the crankcase chambers when the respective pistons 21 are moving upwardly in their cylinder bores 19. As the pistons 21 move downwardly, the charge in the crankcase chambers 25 will be compressed and the respective reed type check valve 32 will close to preclude reverse flow.

Figure 3:
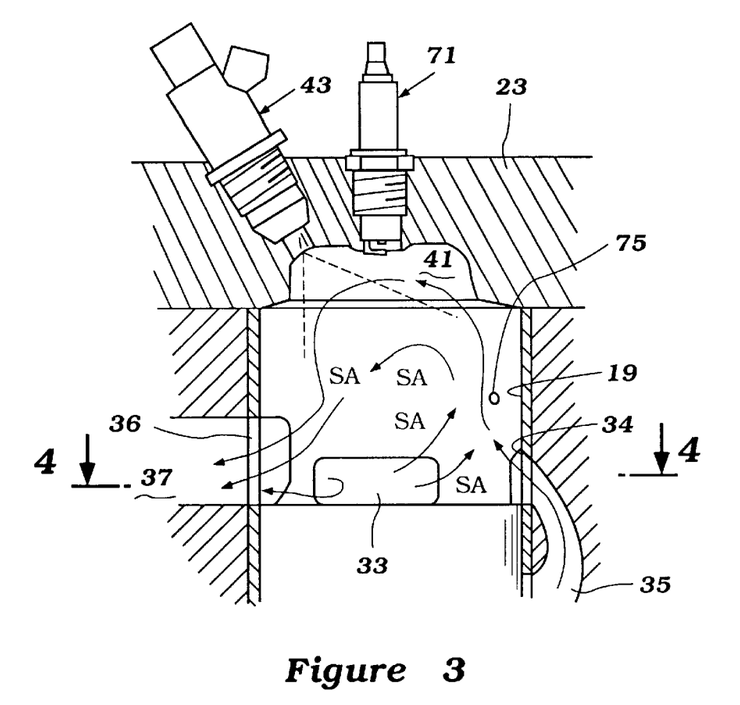
FIG. 3 is an enlarged cross-sectional view taken through a single cylinder of the engine and depicts part of the theory by which the control strategy operates.
Figure 4:
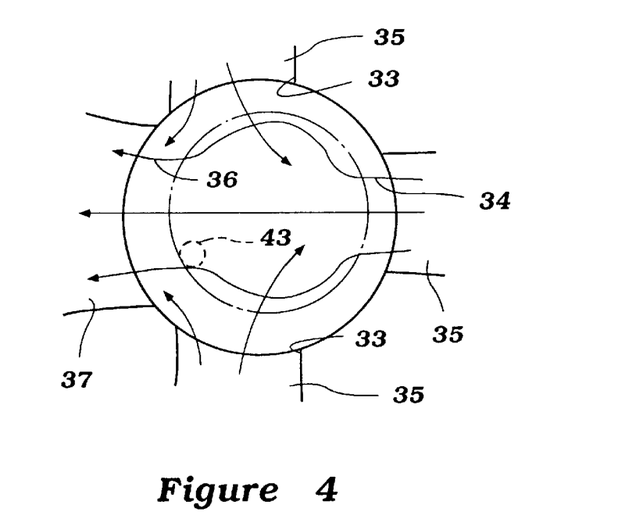
FIG. 4 is a cross-sectional view taken along the line 4—4 in FIG. 3 to further show the scavenging air flow pattern and the path of injected fuel.

Referring now additionally to FIGS. 3 and 4, it will be seen that each cylinder bore is provided with a scavenging system. In the illustrated embodiment, the scavenging system is of the Schnurl type and includes a pair of side, main scavenge ports 33 and a center, auxiliary scavenge port 34. Scavenge passages 35 communicate the crankcase chambers 25 with each of the scavenge ports 34 and 35. As is well known in two cycle practice, the scavenge ports 33 and 34 are opened and closed by the reciprocation of the pistons 21 in the cylinder bores 19.

It should be noted that the main scavenge ports 33 are disposed on opposite sides of an exhaust port 36 which is diametrically opposite the auxiliary scavenge port 34. As may be best seen in the lower left hand portion of FIG. 1 and in FIG. 2, the exhaust ports 36 communicate with exhaust manifolds 37 that are formed integrally within the cylinder block 18. Basically, there is an exhaust manifold 37 for each bank of cylinders.

These exhaust manifolds 37 terminate in exhaust pipes 38 that depend into a pair of expansion chambers 39 formed in the driveshaft housing and lower unit 16. These expansion chambers 39 communicate with a suitable high speed underwater exhaust gas discharge and a low speed, above the water exhaust gas discharge of any known type.

The underwater exhaust gas discharge is shown primarily in FIG. 2 and includes a conduit 40 that depends through the lower unit portion of the drive shaft housing lower unit and which communicates through the hub underwater discharge formed in the propeller 17.

As has been previously noted, the trim and height of the propeller 17 can be adjusted and this adjustment will change the depth of submersion of the underwater discharge during engine running. In addition, various water conditions may also cause this height to vary during engine running. Thus, the back pressure on the exhaust system will be variable and this back pressure is particularly significant in effecting the rate of air flow in scavenging the combustion chambers of the engine. Thus, a condition is present with marine applications that is not existent normally in automotive applications and which can seriously effect the feedback control, as will be described shortly.

As the pistons 21 move downwardly in their cylinder bores 19 toward the bottom dead center position shown in FIG. 3, the charge compressed in the crankcase chambers 25 will be compressed and eventually transfer to the respective engine combustion chamber, indicated generally by the reference numeral 41 through the scavenge passages 35 and scavenge ports 33 and 34 when they are opened by the movement of the piston 21. The flow of scavenging air is shown in FIGS. 3 and 4 by the arrows SA.

In accordance with an important feature of the invention, the engine 13 is provided with a direct cylinder fuel injection system. This fuel injection system is shown in part schematically in the upper portion of FIG. 1 and will now be described by particular reference to that figure. Before referring thereto, however, it should be noted that fuel injectors 42 are mounted in the cylinder head assembly 23 so as to spray fuel from this fuel supply system directly into the combustion chambers 41. The location and functioning of these fuel injectors 43 will be described after the system which supplies fuel to them has been described.

As is typical with outboard motor practice, the outboard motor 11 is supplied with fuel from a main fuel tank 44 which is normally mounted within the hull of the associated watercraft. Fuel is supplied form this tank 44 by a first low pressure pump 45 to a fuel filter 46 that is mounted within the protective cowling 12. The connection from the fuel tank 44 to the filter 46 includes a conduit 47 having a quick disconnect coupling of a known type.

A second, engine driven low pressure fuel pump 47 in the power head 12 collects the fuel from the fuel filter 46 and delivers it to a vapor separator, indicated generally by the reference numeral 49. The low pressure fuel pumps 48 may be of the type that are operated by crankcase pressure variations as is well known in this art.

The vapor separator 49 includes an outer housing 51 that is mounted at a suitable location within the protective cowling 15. A level of fuel, indicated at 52 is maintained in this housing 51 by a valve operated by a float 53.

Contained within the housing 51 is an electrically driven pressure pump 54 which develops a higher pressure than the pump 47 but a pressure that is not really high enough for effective high pressure direct cylinder injection.

This fuel is discharged from the vapor separator housing 51 through a supply conduit 55 to a high pressure, engine driven, positive displacement pump 56. The pump 56 may be of any known type and preferably has one or more plungers operated by cams for delivering extremely high pressures at a positive displacement. The pressure at which fuel is delivered to the high pressure pump 56 is regulated by a low pressure regulator 57 in a return line 58 that communicates the pressure line 55 back with the interior of the vapor separator body 51.

The high pressure pump 56 delivers fuel under pressure to a main fuel manifold 59 through a conduit in which a check valve 61 is positioned. A parallel conduit 62 extends around the high pressure pump 56 to the main fuel manifold. A check valve 63 is provided in this bypass line so that when the high pressure pump 56 is generating high pressure fluid, no flow will occur through the line 62.

A high pressure regulator 64 is provided in the main fuel manifold 59 and limits the maximum pressure of the fuel supply to the fuel injectors 43. This is done by dumping fuel back to the vapor separator assembly 49 through a return line 65. A fuel heat exchanger or cooler 66 may be provided in this return line 65 so as to ensure that the fuel is not at too high a temperature.

A pressure sensing device 67 is provided also in the main fuel manifold 59 for providing a fuel pressure signal to an ECU, indicated at 68 in FIG. 1 for controlling the engine systems, as will be described.

The main fuel manifold 59 supplies fuel to a pair of fuel rails 69 each of which is associated with a respective one of the cylinder banks. The fuel rails 69 each supply fuel in a known manner to the fuel injectors 43 of the respective cylinder banks.

As seen in FIGS. 3 and 4, the fuel injectors 43 are mounted in the cylinder head assemblies 23, in the illustrated embodiment, over the exhaust ports 36 on the exhaust side of the engine. These injectors spray downwardly toward the heads of the pistons 21. The fuel injectors 43 are preferably of the solenoid operated type and have a solenoid valve which, when opened, controls the discharge of fuel into the combustion chambers as shown in broken lines in FIG. 3 so as to provide a fuel patch in the combustion chamber, the size of which depends upon the duration of fuel injection as will become apparent.

Spark plugs 71 are mounted in the cylinder head assemblies 23 and have their spark gaps disposed substantially on the axis of the cylinder bores 19. These spark plugs 71 are fired by an ignition circuit under the control of the ECU 68.

The ECU 68 controls the timing of firing of the spark plugs 71 and the beginning and duration of fuel injection by the injector 69. To this end, there is provided a number of sensors which sense either engine running conditions, ambient conditions or conditions of the outboard motor 11 that will effect engine performance. Certain of the sensors are shown schematically in FIG. 1 and will be described by reference to that figure. It should be readily apparent to those skilled in the art, however, that other types of sensing and control arrangements may be provided operating within the general parameters which will be set forth later having to do with the timing of initiation of fuel injection.

A crank angle sensor 72 is associated with the crankshaft 14. This sensor 72 provides not only a signal of crank angle but by comparing that signal with time an indication of crankshaft rotational speed.

There is also provided a crankcase pressure sensor 73 which senses the pressure in one or all of the crankcase chambers 25. By measuring crankcase pressure at a particular crank angle, engine air induction amount can be determined.

Engine or operator demand is determined by a throttle position sensor 74 that operates in conjunction with a throttle valve 28 so as to determine this function.

The ECU 68 operates primarily on a feedback control condition and thus, an air fuel ratio sensor 75 is provided that communicates with the combustion chambers or exhaust port of at least one of the cylinder. Preferably, an oxygen ($O_2$) sensor is utilized for this purpose, although other types of devices may be employed.

In order to provide a good indication of the fuel/air ratio, it is important that the oxygen sensor 75 is positioned so that it will sense the combustion products near the completion of combustion and before a fresh charge of air is delivered to the combustion chamber. Therefore, and as best shown in FIG. 3, the oxygen sensor 75 is provided so that its probe opens into the cylinder bore 19 at a point that is disposed slightly vertically above the upper edge of the exhaust port 36. In this way, the oxygen sensor 75 will be in a position to receive combustion products immediately before opening of the exhaust port and most positively before the opening of the scavenge ports so that it will sense the combustion products at the time combustion has been substantially completed. However, this places the oxygen sensor 75 in a position where fuel from the fuel injector may reach it and thus its sensitivity may be directly effected. This is compensated for in a manner which will be described later.

Engine temperature is sensed by a engine temperature sensor 76.

The temperature of the cooling water drawn from the body of water in which the watercraft or outboard motor 11 is operated is measured by a water temperature sensor 77. As has been noted, those sensors described may be just typical of any of the wide variety of sensors utilized for engine control.

In addition to controlling timing of firing of the spark plugs 71 and initiation and duration of fuel injection by the fuel injectors 43, the ECU 68 may also control a lubricating system. This is comprised of an oil supply system including a pump 78 that sprays oil into the intake passages 29 for engine lubrication. In addition, some forms of direct lubrication may be also employed for delivering lubricant directly to certain components of the engine.

It has already been noted that the adjustment of the angle of the propeller 17 will change the vertical position of its high-speed exhaust discharge and accordingly the back pressure. Thus, there are provided additional sensors which sense factors that will indicate this depth. These comprise an engine height sensor 79 that is mounted on the outboard motor 11 and which senses its height adjustment. Also, a trim angle sensor 81 is provided which senses the adjusted trim angle.

Other sensors may also be employed for control and some of these are associated with the engine 13 or the outboard motor 11 itself. These may include an engine vibration or knock sensor 82 and a neutral sensor 83. The neutral sensor 83 cooperates with the aforenoted forward, neutral, reverse transmission and will provide an indication of when the watercraft is operating in neutral.

Also shown schematically in FIG. 1 is a watercraft speed sensor 84 and a watercraft pitch sensor 85 that will sense the condition of the watercraft relative to the body of water and again indirectly the back pressure in the exhaust system. Finally, there is provided an atmospheric pressure sensor 86. Of course, the sensors described are only typical of those types of sensors which may be employed for the feedback control system, as will become apparent.

The components of the system as thus far described may be considered to be conventional and for that reason, where any component has not been illustrated or described in detail, reference may be had to conventional or known structures with which to practice the invention. The invention deals primarily with the timing of beginning of fuel injection and also the duration of injection particularly during operation. The specific form of control employed under certain running conditions is significant in accordance with the invention, as will be described.

Figure 5:
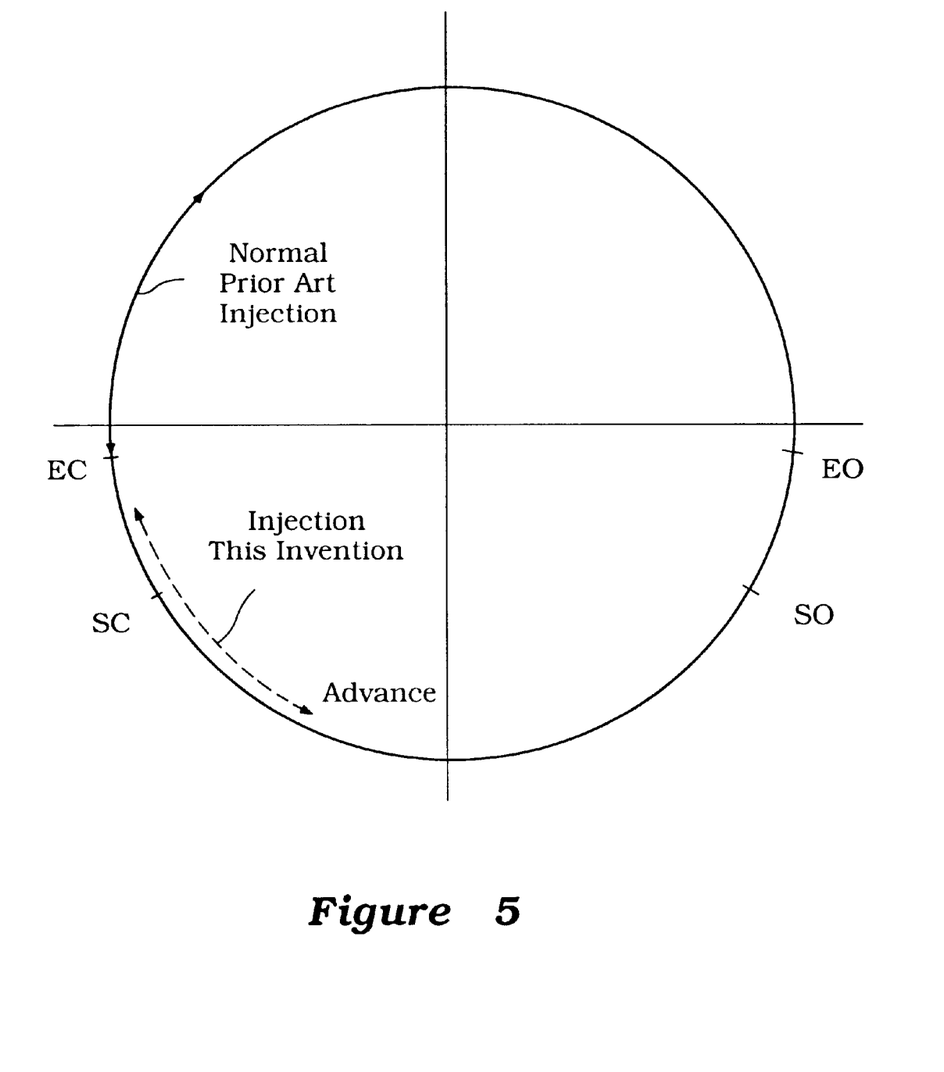
FIG. 5 is a timing diagram showing the fuel injection strategy in accordance with the invention in relation to crank angle and also the prior art type of strategy.

This may be understood by first referring to the timing diagram shown in FIG. 5. The direction of crankshaft rotation is indicated by the arrow R and the piston top dead center position, as shown in FIG. 5, is indicated at TDC. Bottom dead center position is indicated in FIG. 5 as BDC. This figure also shows the timing of opening of the scavenge and exhaust ports and their respective closing. The opening of the exhaust ports 36 occurs when the piston passes the upper edge of the exhaust port 36. This point is indicated as EO in FIG. 5.

As the pistons 21 continue their downward movement eventually the scavenge ports will open when their upper edges are opened by the downward movement of the pistons 21. This point appears in FIG. 5 as SO.

The scavenging operation continues when the piston 21 passes bottom dead center and begins to move upwardly to begin to close the scavenge ports 33 and 34 by passing their lower edges. Full closure of the scavenge ports occurs at the point SC in FIG. 5 when the piston again passes the upper edge of the scavenge ports 33 and 34.

Finally, the exhaust ports 36 are closed when the pistons 21 pass their upper edges 78 at the point EC.

With conventional engine injection strategies, the fuel injection is begun generally almost immediately after the exhaust ports 36 are closed with the duration being determined by the load on the engine. This is shown in FIG. 5. As may be seen in FIGS. 3 and 4, the scavenge air flow acts so as to take the fuel patch and drive it toward the exhaust port 36. Thus, the conventional practice is to cause the injection to happen late in the cycle before the piston reaches top dead center and immediately before firing. As more fuel is required, the injection duration is extended. However, this may cause the fuel to travel to the exhaust port before combustion has been completed and when the exhaust port again opens some unburned fuel may escape.

Also the velocity of air flow in the combustion chamber at this time is relatively low and there will be poor mixing of fuel with the air. The low air velocity also results in poor flame propagation and poor and/or incomplete combustion results.

In accordance with the invention, the injection timing is initiated before a point where the injected fuel path toward the exhaust port 36 and considering the air flow within the combustion chamber will not reach the exhaust port before it has fully closed. This concept is described in full detail in our copending application entitled "Control for Direct Injected Two-Cycle Engine," Ser. No. 09/188,953, filed Nov. 10, 1998, and assigned to the Assignee hereof.

Since this invention relates primarily to control under certain specific running conditions, a full description of the basic control strategy is not believed necessary to understand or practice this invention. However, in accordance with the invention, the fuel injection is initiated at a time after bottom dead center and before exhaust port closing and continuing to a point before the exhaust port closes. The actual time of starting of injection and the duration are controlled by a feedback control and certain portions of that routine will now be described.

Figure 6:
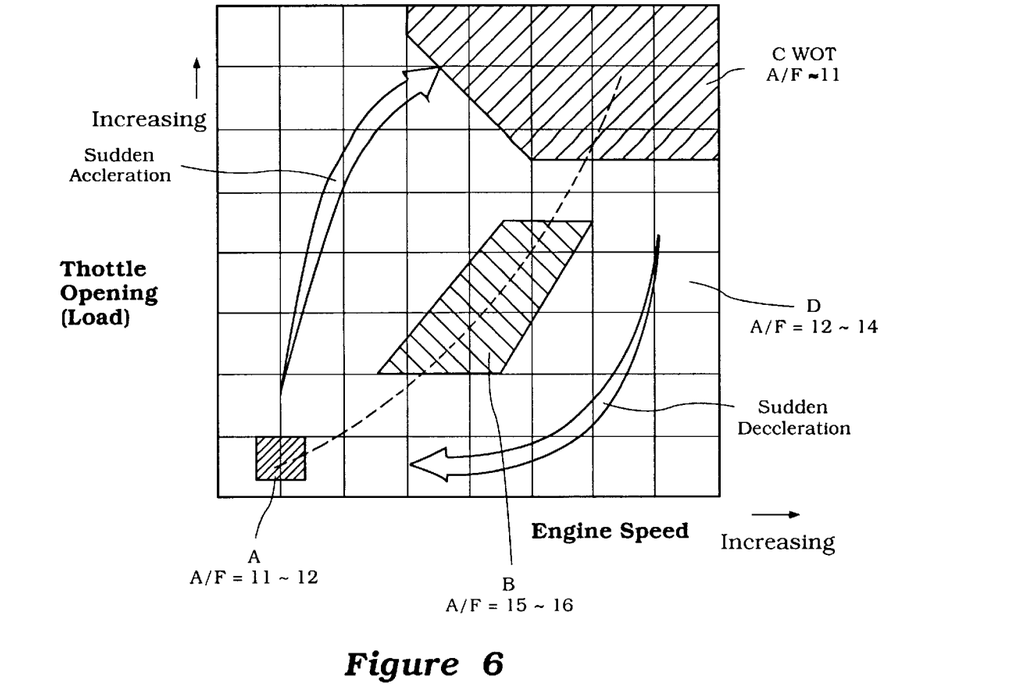
FIG. 6 is a map that shows the different control ranges that are employed in conjunction with the control strategy.

The basic control system operates to set a preferred air fuel ratio depending on the running conditions. This preferred ratio is chosen from a map as seen in FIG. 6 and in a manner to be described shortly. Then the actual air fuel ratio is read by the sensor 75. The system then operates to make corrections, as shown in FIG. 8, to bring the ratio back to the desired ratio, as is typical with feedback control systems.

The various operating ranges are shown in FIG. 6, as aforenoted and will now be described. FIG. 6 is a graphical view showing the determinations that are made in the ECU 68 to determine the engine operational range. Under light loads and speeds the mixture is kept rich and the air/fuel ratio is set so as to be in the range of about 11 to 12 to 1. This range is indicated by the reference character A.

In midrange conditions there is a control range indicated at B where the engine is operated in a lean burn condition and the mixture may be somewhat stratified. This range is indicated by the reference character B and in this range the air/fuel ratio is maintained in the range of about 15 to 16 to 1.

Under high load/high speed conditions which approaches wide open throttle, there is a third control range indicated at C where the mixture is run on the excessively rich side to protect the engine from damage. In this range, the air to fuel ratio is maintained about 11 to 1.

There is a remaining range outside of those noted which is indicated at D and in this range the mixture is kept on the weak side of rich, i.e., around 12 to 14 to 1.

There are also two other types of conditions which are indicated by the open arrows one of which represents sudden acceleration and the other of which indicates sudden deceleration.

Figure 7:
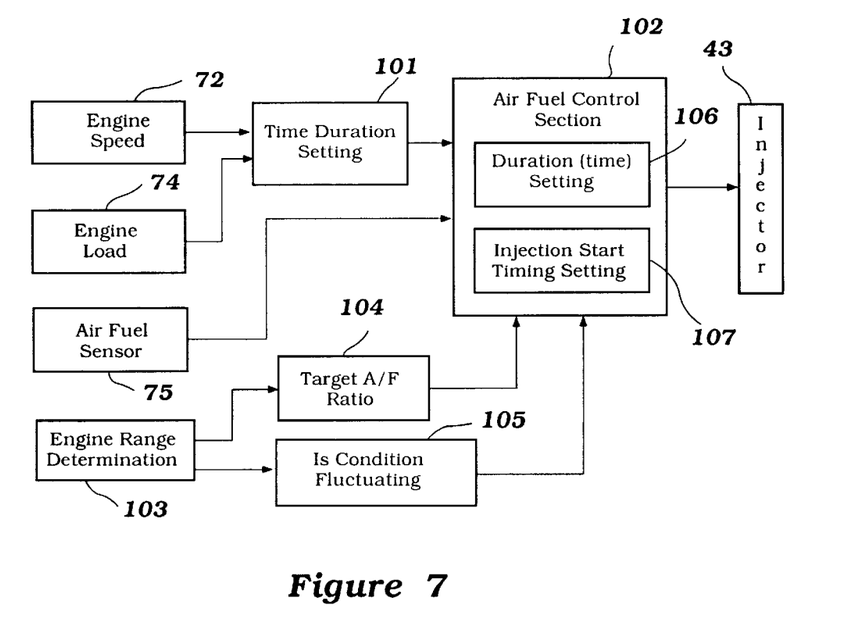
FIG. 7 is a partially schematic view showing the interrelationship between the various components of the control system.

The basic components of the ECU 68 that provide this control appear schematically in FIG. 7 and are shown in their relationship to the various engine and watercraft condition sensors. These sensors, as shown in FIG. 7, include the engine speed sensor, which comprises the crank angle sensor 72. As has been previously noted, by measuring the crank angle with time, it is possible to determine engine speed. In addition, engine load is determined by the position of the throttle valve by utilizing the throttle position sensor 74.

The output from these two sensors are transmitted to a section 101 of the ECU which determines the time duration of fuel injection and the timing of beginning of an injection from suitable maps, as will be described. This information is then outputted to the air fuel ratio control means of the ECU which is indicated schematically at 102.

The output of the oxygen sensor 75 is also transmitted to this control and the control then is capable of comparing the desired air fuel ratio, which will be mentioned shortly, with the actual air fuel ratio and make corrections in the injection timing and duration.

The system also includes an engine operating condition determining section 103 which basically operates to also receive the signals from the engine speed and engine load sensors 72 and 74, respectively, and determine which part of the map of FIG. 6 the engine is operating in.

This information is then transmitted to a Section 104 of the ECU which sets the desired air fuel ratio from the map, as shown in FIG. 6. This information is then transmitted to the calculating control section 102.

In accordance with the invention, the system also determines if the system is operating in a fluctuating range where minor changes in air fuel ratio may make significant changes in engine performance, as will be described later by reference to FIG. 9. This determination is made by a further section 105 of the ECU and that information is also transmitted to the air fuel ratio control section 102.

The air fuel ratio control section 102 has a first section 106 that determines the duration of fuel injection or the injection amount. In addition, a second section 107 determines the timing at which fuel injection will occur. This information is then outputted to the injectors 43 so as to operate them at the desired timing and duration.

FIG. 8 is a graphical view showing the output of the oxygen sensor (A), the amount of adjustment that should be made in the air fuel ratio (B), and the resulting changed air fuel ratio (C). The curve (D) shows the way in which the steps of adjustment are made.

Continuing to refer to this figure, at the point a1, the output of the oxygen sensor 75 is moving from the lean to the rich side. Therefore, at this time, the mixture should be leaned in order to bring the air fuel ratio back to the desired ratio. As seen in the lower curve, under normal conditions, this adjustment is made by first creating a reduced duration of time injection $P_{RL}$. If, after a predetermined time, the air fuel ratio still has not returned to the desired ratio, then smaller adjustments are made and these are made by changing the injection timing. To go back to a lean mode, the timing is normally retarded in amounts indicated $I_{RL}$ in successive steps until the correction amount falls back to that at the point a2 when the mixture goes from rich to lean. Adjustments are then made in the opposite sense.

Figure 9:
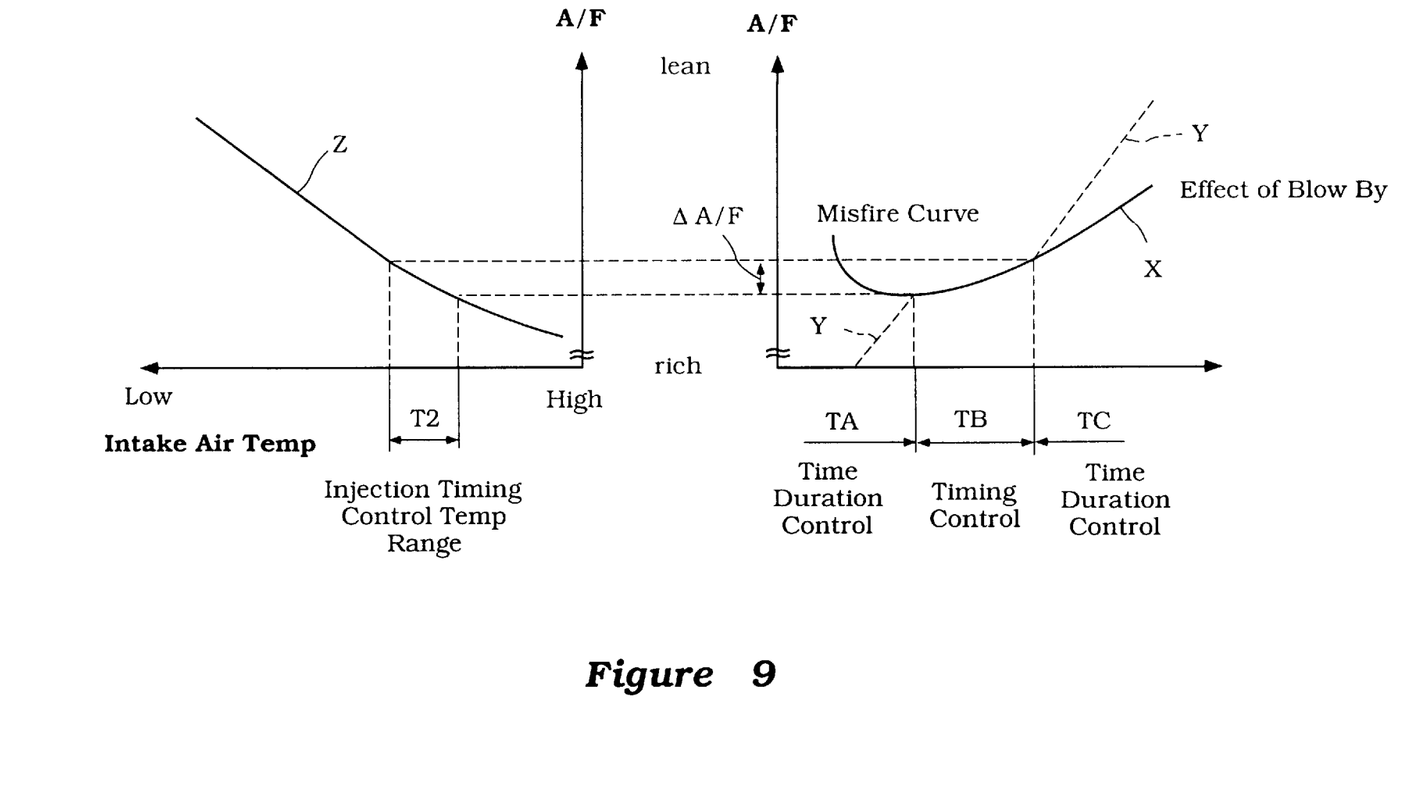
FIG. 9 is a graphical view to explain the theory upon which the invention operates and showing how intake air temperature and injection timing affect the air fuel ratio.

Referring now to FIG. 9, it will be seen that there are two families of curves, one shown on the left, and one shown on the right, both of which have on their ordinates the air fuel ratio progressing from lean at the top to rich at the bottom.

The left hand curve shows the condition of variation in air fuel ratio with a fixed amount of fuel injected and varying the intake air temperature. As may be seen, as the intake air temperature increases, the mixture becomes richer for a fixed amount of fuel injected because the density of the air charge is less.

On the right hand side of the curve, there is shown the effect of injection timing on air fuel ratio. This effects the air fuel ratio even if the amount of fuel injected is the same. This is because of the effect of blowby of the fuel out of the exhaust port when the injection timing is too advanced. There is shown a graph X which is a curve showing the blowby effect. Normally the air fuel ratio would vary linearly as shown by the broken line Y. However, due to the blowby effect, there is a distinct misfiring potential in an area where there are relatively small changes in the air fuel ratio $\Delta AF$ which coincides with an injection timing control temperature range indicated on the left hand side as TZ.

Within this range, changes in air fuel ratio must be kept relatively small to avoid misfiring. Therefore, in the range TB, the air fuel ratio is adjusted, not by changing primarily the injection duration, but by changing the injection timing in accordance with the invention. Outside of this range in the ranges TA and TC, the injection control is primarily by controlling the duration of injection, as noted in the previous figure. This is the feature of this invention that is employed to avoid misfiring and improve engine smoothness.

Figure 10:
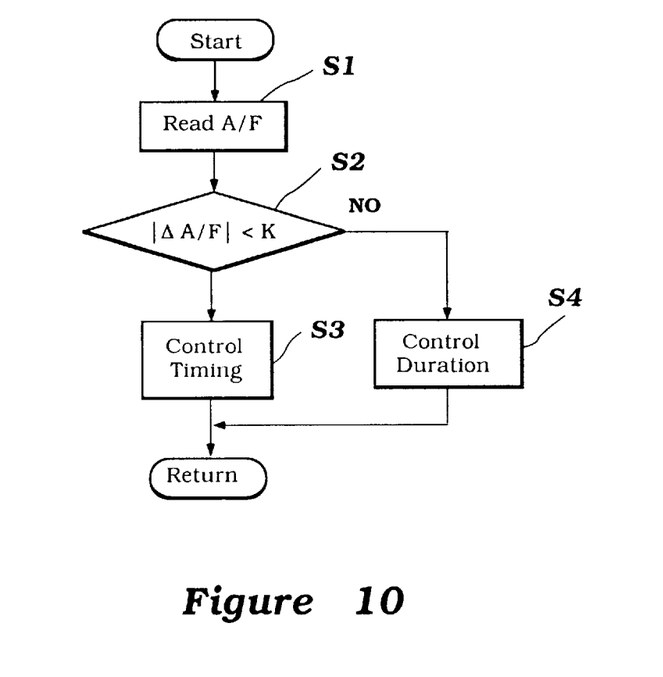
FIG. 10 is a diagram showing the control routine by which the type of control is chosen.
Figure 11:
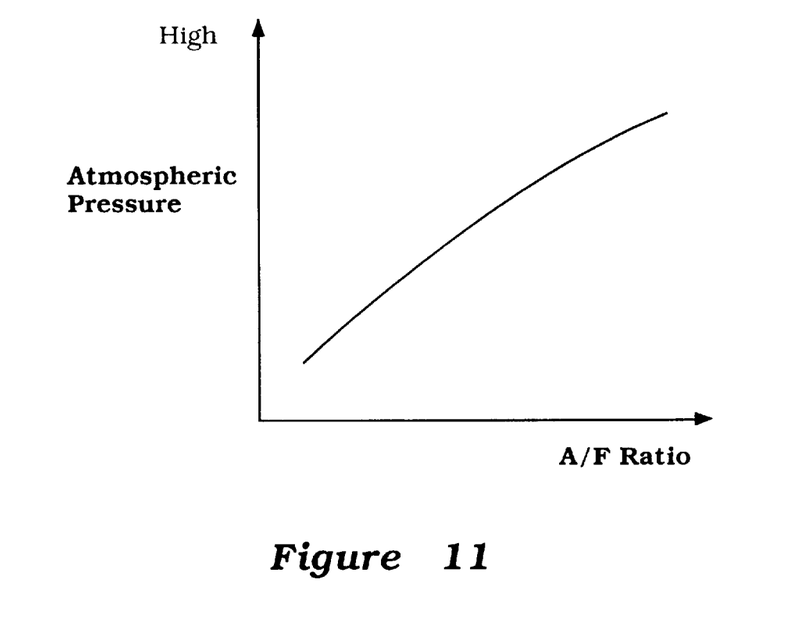
FIG. 11 is a graphical view showing how atmospheric pressure can alter the air fuel ratio.

FIG. 10 is a view that shows the control routine that is utilized in conjunction with the invention. The program starts and then moves to step S1 so as to read the air fuel ratio from the output of the oxygen sensor 75. Then, the program moves to the step S2 to perform the function performed by the unit or block 105 of FIG. 7 to determine if the air fuel ratio is in the small fluctuating range. This is done by comparing to see if $\Delta AF$ is less than K. K is the value which is assigned to the air fuel ratio where there are small variations.

Figure 8A:
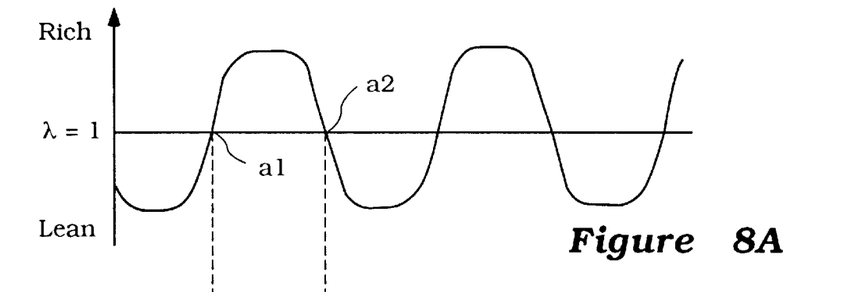
FIG. 8 is a graphical view showing how the control routine operates in accordance with a feature of the invention.
Figure 8B:
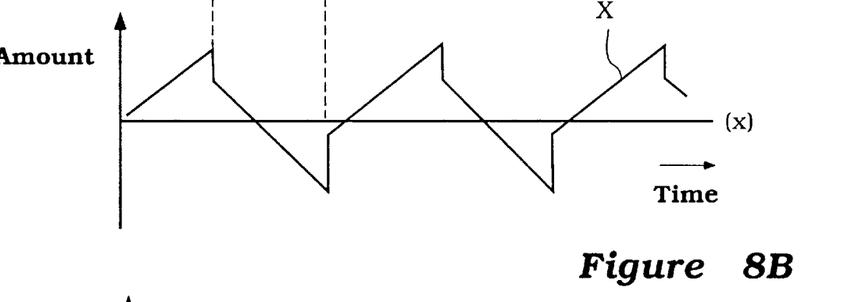
Figure 8C:
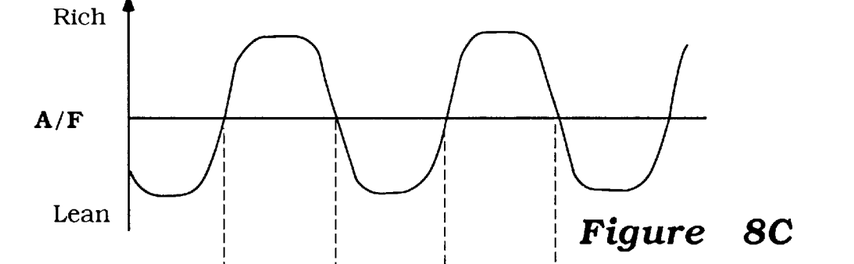
Figure 8D:
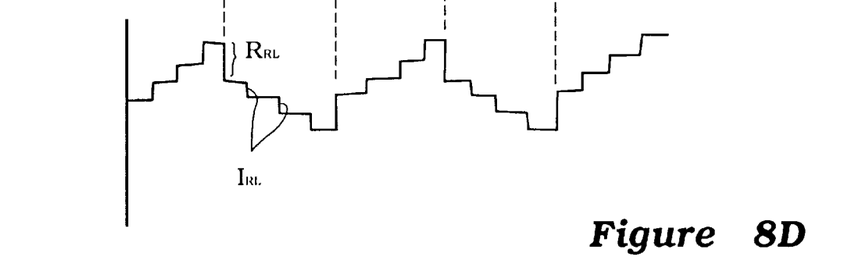

If the ratio is in this range, then the program moves to the step S3 so as to effect adjustments primarily by engine injection timing. In other words, the first step in FIG. 8d is not a duration change, but rather is a timing advance change. The program then returns.

If, however, as the step S2 has determined that the ratio is outside of the narrow change ratio, then the program moves to the step S4 so as to utilize the normal control routine where air fuel ratio is maintained primarily by adjusting the duration of fuel injection.

The embodiment thus far described was in connection with a two cycle engine. As mentioned earlier, however, the invention also can be utilized with four-cycle engines and such engine embodiment is shown in FIG. 12. The illustrated embodiment is of a V6 twin overhead cam shaft engine. The overhead cam shaft mechanism appears in this figure and is identified generally by the reference numeral 201.

Since the invention can be practiced with any type of conventional four-cycle engine as well as any type of two cycle engine, further description of this embodiment is not believed to be necessary to permit those skilled in the art to practice the invention. Also, since primarily the same parameters are measured, the same sensor arrangements have also been illustrated in this figure. In view of the foregoing description, however, it is believed unnecessary to fully describe this embodiment since it is believed that those skilled in the art will literally understand how the invention can be practice with four-cycle engines as well as two cycle engines.

Thus, from the foregoing description, it should be readily apparent that the described embodiment is very effective in providing good feedback control utilizing an oxygen sensor with a direct injected engine, and also which will improve or reduce the likelihood of misfiring. Of course, the foregoing description is that of preferred embodiments of the invention and various modifications and changes may be made without departing from the spirit and scope of the invention, as defined by the appended claims.

What is claimed is:

1. A direct cylinder injected, internal combustion engine comprised of an engine body defining at least one cylinder bore in which a piston reciprocates, a cylinder head affixed to one end of said engine body for closing said cylinder bore and defining with said piston and said cylinder bore a combustion chamber, at least one intake port for admitting an air charge to said combustion chamber, at least one exhaust port for discharging burned combustion products from said combustion chamber, a fuel injector for spraying fuel directly into said combustion chamber for combustion therein, a combustion condition sensor provided in proximity to said fuel injector for determining the air/fuel ratio in said combustion chamber, and a feedback control system for controlling the initiation of fuel injection and the duration of fuel injection based upon the output from said combustion condition sensor to maintain the desired fuel/air ratio, said feed back control being effective to control the fuel/air ratio during engine running condition requiring large changes in fuel air ratio primarily by adjusting initially the duration of fuel injection and during engine running condition requiring small changes in fuel air ratio primarily by adjusting initially the timing of beginning of fuel injection in order to maintain the desired fuel/air ratio.

2. A direct cylinder injected, internal combustion engine as set forth in claim 1 wherein the air fuel ratio is adjusted in response also to at least one of the following conditions: engine temperature, inducted air temperature, and atmospheric pressure.

3. A direct cylinder injected, internal combustion engine as set forth in claim 1 wherein the engine operates on a two cycle crankcase compression principle.

4. A direct cylinder injected, internal combustion engine as set forth in claim 3 wherein the engine powers a marine propulsion device.

5. A direct cylinder injected, internal combustion engine as set forth in claim 4 wherein the engine exhaust port delivers the exhaust gasses to the atmosphere through the body of water in which the marine propulsion device operates under at least some running conditions.

6. A direct cylinder injected, internal combustion engine as set forth in claim 1 wherein the engine operates on a four cycle principle.

7. A direct cylinder injected, internal combustion engine as set forth in claim 6 wherein the engine powers a marine propulsion device.

8. A direct cylinder injected, internal combustion engine as set forth in claim 7 wherein the engine exhaust port delivers the exhaust gasses to the atmosphere through the body of water in which the marine propulsion device operates under at least some running conditions.

9. A method of operating a direct cylinder injected, internal combustion engine comprised of an engine body defining at least one cylinder bore in which a piston reciprocates, a cylinder head affixed to one end of said engine body for closing said cylinder bore and defining with said piston and said cylinder bore a combustion chamber, at least one intake port for admitting an air charge to said combustion chamber, at least one exhaust port for discharging burned combustion products from said combustion chamber, a fuel injector for spraying fuel directly into said combustion chamber for combustion therein, said method comprising the steps of determining the air/fuel ratio in said combustion chamber, and controlling the initiation of fuel injection and the duration of fuel injection based upon the sensed fuel air ratio to maintain the desired fuel/air ratio, said control of the fuel/air ratio during engine running condition requiring large changes in fuel air ratio being made primarily by adjusting initially the duration of fuel injection and during engine running condition requiring small changes in fuel air ratio primarily by adjusting initially the timing of beginning of fuel injection in order to maintain the desired fuel/air ratio.

10. A method of operating a direct cylinder injected, internal combustion engine as set forth in claim 9 wherein the engine operates on a two cycle crankcase compression principle.

11. A method of operating a direct cylinder injected, internal combustion engine as set forth in claim 10 wherein the engine powers a marine propulsion device.

12. A method of operating a direct cylinder injected, internal combustion engine as set forth in claim 11 wherein the engine exhaust port delivers the exhaust gasses to the atmosphere through the body of water in which the marine propulsion device operates under at least some running conditions.

13. A method of operating a direct cylinder injected, internal combustion engine as set forth in claim 9 wherein the engine operates on a four cycle principle.

14. A method of operating a direct cylinder injected, internal combustion engine as set forth in claim 13 wherein the engine powers a marine propulsion device.

15. A method of operating a direct cylinder injected, internal combustion engine as set forth in claim 14 wherein the engine exhaust port delivers the exhaust gasses to the atmosphere through the body of water in which the marine propulsion device operates under at least some running conditions.

* * * * *